(Model.)

E. L. PERKINS.
PADLOCK.

No. 256,159. Patented Apr. 11, 1882.

Witnesses:
John H Carter
Sheldon F Payne

Inventor:
Elihu L Perkins

UNITED STATES PATENT OFFICE.

ELIHU L. PERKINS, OF GENEVA, OHIO.

PADLOCK.

SPECIFICATION forming part of Letters Patent No. 256,159, dated April 11, 1882.

Application filed November 8, 1880. (Model.)

*To all whom it may concern:*

Be it known that I, ELIHU L. PERKINS, a citizen of the United States, residing at the village of Geneva, in the county of Ashtabula and State of Ohio, have invented a new and useful Padlock, of which the following is a specification.

My invention relates generally to that class of padlocks in which the shackle is engaged by a dog or dogs governed by tumblers, and especially to the devices for engaging and releasing the shackle, and means for controlling said devices, its object being to increase the security and durability of this class of locks.

Figure 1:
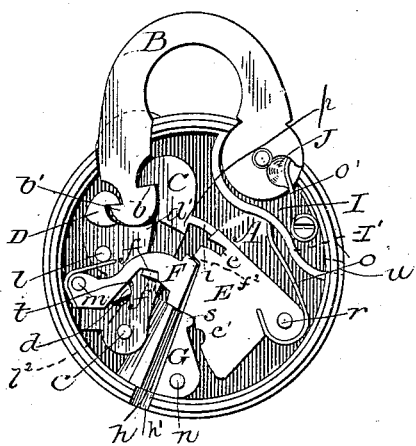
Figure 2:
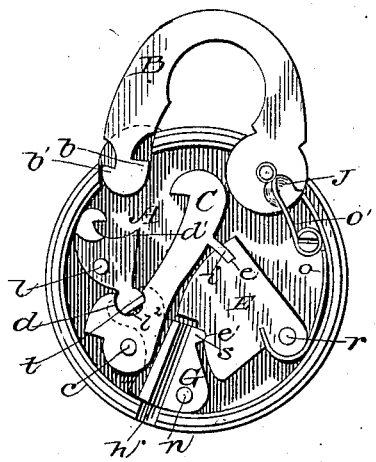
Figure 3:
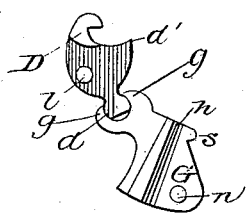
Figure 4:
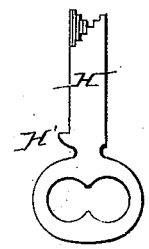

In the accompanying drawings, Figure 1 is a view of a padlock constructed according to my invention, one of the side walls of the case being removed in order to expose to view the interior parts. Fig. 2 is a similar view of a modification. Fig. 3 is a detached view of one of the hooked dogs and its operating-lever, and Fig. 4 is a view of a key of a style suitable for operating the locks shown in Figs. 1 and 2.

Referring to Fig. 1, the letter A designates the case, and B is the shackle, pivoted at one end therein in the ordinary manner. The shackle is provided with catches $b$ and $b'$ on opposite sides, and C and D denote hooked dogs for engaging said catches. The dog C is pivoted at $c$ at its lower end, and is provided intermediately with a bearing $l^2$, which partly embraces an approximately semicircular lug, $d$, at the lower end of the dog D, this latter dog being pivoted intermediately on a pin, $l$, so that its movement will cause a movement to the left in dog C. The connection between the two dogs is the same and more clearly shown in Fig. 2.

Returning to Fig. 1, it will be observed that the dog D, the hook of which engages the catch $b'$ of the shackle, is provided with a shoulder, $d'$, which stands in the path of the end of said shackle, and when the latter is closed it strikes the shoulder $d'$, swinging the dog D to the right to engage the catch $b'$, and the lug $d$ simultaneously causes the dog C to swing to the left and engage the catch $b$.

In all the modifications a notch, $t$, is cut from the bearing $l^2$, and when the shackle is out of engagement with the dogs, and said dogs in their open or unlocked position, this notch engages the edge of the lug $d$ and prevents the dogs from swinging toward each other until the shackle is closed upon the shoulder $d'$ to so move the dog D as to take the edge of the lug $d$ out of the notch.

The letter G indicates a plate-lever, pivoted at $n$, and provided with a slot, $h$, to receive the operating-key, which is to be inserted in a key-hole, $h'$, in the peripheral wall of the case. This plate-lever has a laterally-projecting arm, provided with claws $g$ $g$, (clearly shown in Fig. 3,) which partly embrace the lug $d$ of dog D in such manner that when the plate-lever is swung on its pivot a corresponding movement will be communicated to said dog, and from it, as before described, to dog C. The plate-lever is provided with a lug, $s$, to support the tumblers E, which are pivoted at $r$. Only one tumbler E is visible in the drawings; but it will be understood that any number desired may be used in the usual manner. Each of these tumblers has a notch, $e$, to receive the lug $i$, projecting from the back edge of dog C, and each has also a notch, $e'$, to receive the lug $s$ of the plate-lever G. The tumblers are acted upon by springs—such as indicated by $o$—these springs being arranged in the usual manner to hold the tumblers normally so that their notches will not be in line or coincide with each other, and therefore cannot receive the lugs $i$ and $s$ until placed in proper position by the key.

The letter F also indicates a tumbler, pivoted at $m$, and provided in its lower edge with a notch, $f$, which engages a stud, $f$, projecting from the dog C, and at its upper edge with a shoulder, $f^2$, which shoulder, if the tumbler is raised too far, will engage a shoulder, $p$, formed on dog C, and prevent said dog from swinging to unlock. The free end of the tumbler lies in the path of the key through slot $h$, and requires such a form and movement of the key that in unlocking said tumbler will be raised sufficiently to escape the stud $f$, and not so far as to engage the shoulder P.

In Fig. 1 I have shown the shackle pivoted in a separate chamber, I, divided from the main part of the case by an oblique wall, I'. This wall is for the purpose of preventing water from finding its way to the inner working parts of the lock when it leaks in around the pivoted end of the shackle, and $u$ is a passage to permit the water to flow off. The works are thus protected from rust when the lock is exposed in wet weather. The shackle is caused to close by a spring, $o'$, arranged in the usual manner for that purpose.

The lock as now described may be unlocked by means of a key—such as shown at H in Fig. 4—the wards or notches of the same being properly arranged to act upon the tumblers E and F, forcing the former in against the tension of their springs $o$ to bring all the notches $e$ and $e'$ in line to receive the lugs $i$ and $s$, respectively, and raising the tumbler F to just escape the stud $f'$, as before described. The key has a shoulder, $H'$, to prevent its being inserted too far. When this shoulder strikes the casing the key is then moved to the left as far as the hole will permit, this movement causing the plate-lever G to swing on its pivot and communicate the unlocking movement to the dogs, as already described.

The shackle is locked by simply pressing it in against the shoulder $d'$ of the dog D, as also before explained.

In the modification shown in Fig. 2 I have omitted the tumbler F, the other locking devices and tumblers being the same as shown in Fig. 1. With this form of lock I may use a key having the shoulder arranged to press directly upon the edge of the plate-lever G and swing the same, instead of requiring the key to be moved to the left after operating the tumblers.

Having now described my invention and explained the operation thereof, I claim—

1. The combination, with the shackle having two catches on opposite sides of its locking end, of two pivoted dogs, one provided with a lug which bears in a slot in the other dog, said dogs being adapted to simultaneously engage the catches of the shackle, suitable tumblers to engage the dogs, and a slotted plate-lever adapted to operate said dogs substantially as set forth.

2. The combination, with the shackle and the hooked dogs D and C, the latter provided with the stud $f'$ and lug $i$, of suitable tumblers arranged to govern said dogs, and a slotted plate-lever, G, provided with a passage for the key, substantially as set forth.

ELIHU L. PERKINS.

Witnesses:
JOHN A. CARTER,
SHELDON F. PAYNE.